US008315865B2

(12) United States Patent
Kuris

(10) Patent No.: US 8,315,865 B2
(45) Date of Patent: Nov. 20, 2012

(54) METHOD AND APPARATUS FOR ADAPTIVE CONVERSATION DETECTION EMPLOYING MINIMAL COMPUTATION

(75) Inventor: Benjamin Kuris, Brookline, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2713 days.

(21) Appl. No.: 10/838,561

(22) Filed: May 4, 2004

(65) Prior Publication Data

US 2005/0251386 A1 Nov. 10, 2005

(51) Int. Cl.

| | |
|---|---|
| *G10L 15/20* | (2006.01) |
| *G10L 11/06* | (2006.01) |
| *G10L 15/00* | (2006.01) |
| *H04M 1/64* | (2006.01) |

(52) U.S. Cl. ........ 704/233; 704/210; 704/214; 704/215; 704/231; 379/88.01

(58) Field of Classification Search .................. 704/233, 704/214, 210, 231, 215; 379/88.01

See application file for complete search history.

(56) References Cited

U.S. PATENT DOCUMENTS

| | | | | |
|---|---|---|---|---|
| 4,672,669 | A * | 6/1987 | DesBlache et al. | 704/237 |
| 6,249,757 | B1 * | 6/2001 | Cason | 704/214 |
| 6,415,253 | B1 * | 7/2002 | Johnson | 704/210 |
| 6,847,930 | B2 * | 1/2005 | Allen et al. | 704/233 |
| 7,127,392 | B1 * | 10/2006 | Smith | 704/233 |
| 2001/0000190 | A1 * | 4/2001 | Oshikiri et al. | 704/233 |
| 2001/0014854 | A1 * | 8/2001 | Stegmann et al. | 704/211 |
| 2002/0116186 | A1 * | 8/2002 | Strauss et al. | 704/233 |
| 2003/0018475 | A1 * | 1/2003 | Basu et al. | 704/270 |
| 2003/0101052 | A1 * | 5/2003 | Chen et al. | 704/223 |

* cited by examiner

*Primary Examiner* — Paras D Shah

(57) ABSTRACT

A conversation detector and detection method is based on voice band energy detection. The detector is formed of a signal preconditioner, a comparator and an analysis unit. The comparator generates signal pulses reduced in resolution and sample rate (e.g., single bit data) and indicative of energy level and/or duration of activity detected in subject audio signals. The analysis unit determines from the generated signal pulses whether a conversation exists in the subject audio signal. The detector is also able to adapt to environmental noise change, automatically calibrate and operate in low power consumption mode.

17 Claims, 3 Drawing Sheets

METHOD AND APPARATUS FOR ADAPTIVE CONVERSATION DETECTION EMPLOYING MINIMAL COMPUTATION

BACKGROUND OF THE INVENTION

The technology area of audio signal processing includes voice detection/recognition and speech detection/recognition. Voice detection and recognition connote analysis of respective individual's vocal chord signals. Speech detection/recognition is less focused on individual speaker characteristics and more directed toward the determination of "units" (e.g., words) or spoken terms given the language on which the subject speech signal is based. For example, speech recognition is employed in the indexing and analysis of recorded speech.

Given the foregoing, the term "conversation" may mean speech or speech-like activity prolonged over a (minimum) threshold period of time. A conversation detector thus determines the existence of such prolonged speech activity. Conversation detection is not as focused on individual speaker characteristics as in voice detection/recognition and is not as language dependent as speech detection/recognition.

To date, there are limited conversation detectors. In the telephony area, conversation detectors are used to determine when to stop broadcasting so that the broadcasting of static or silence is minimized and/or prevented. In this setting, speed and accuracy of the conversation detector are of primary concern. Various technologies have been developed toward improving speed and/or accuracy in such conversation detectors.

SUMMARY OF THE INVENTION

The present invention is directed to application of conversation detectors in medical, business and other fields.

In one embodiment, apparatus for detecting conversation includes:

- a signal preconditioner responsive to a source audio signal from a subject and producing a pre-emphasized signal;
- a comparator coupled to receive the pre-emphasized signal and generating pulses reduced in resolution and sample rate and indicative of a characteristic of the pre-emphasized signal (such as energy level, duration, of activity, etc.); and
- an analysis unit (preferably real time) responsive to the generated pulses utilizing adaptive rules and indicated characteristics of the pre-emphasized signal to determine therefrom existence of a conversation by the subject.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
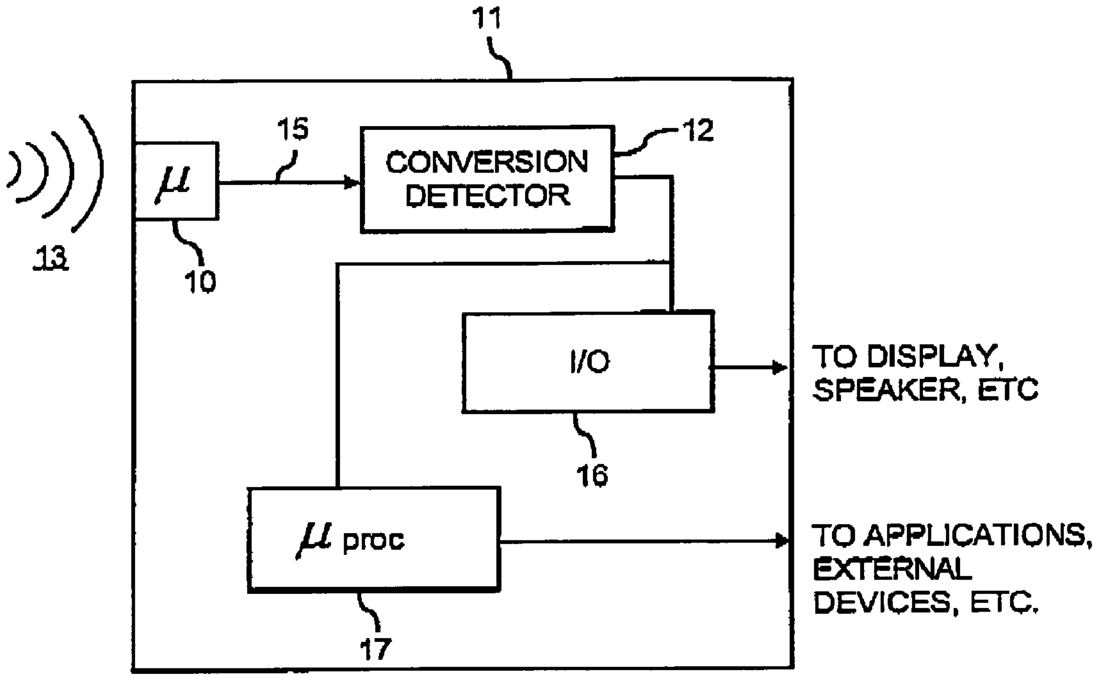
FIG. 1 is a schematic diagram of one embodiment of the present invention.

Applicants have discovered many different uses for conversation detectors beyond those in the prior art. A successful user experience in many of these new uses requires the low power consumption and simple computational requirements of the present invention. For example, in the medical field, social behavior may be analyzed using conversation detectors. Frequency of conversation may be used in the analysis of overall mental well-being. Onset and development of Alzheimer's disease may be detected and/or monitored using conversation detection. For adherence these detectors must be unobtrusive and easy to maintain for patients and caregivers. These and other medical uses of the present invention are provided.

In the business industry or professional development setting, the present invention conversation detectors enable analysis of interpersonal skills. In one example, the conversation detector in response to detecting conversation activates a video camera or audio recorder or the like. This captures the subject in a test or sample conversation for analysis. In the subsequent analysis, points of improvement can be brought to light.

In other business setting, the present invention conversation detectors, in response to detecting conversation by a person making a presentation, activates a video recorded presentation or other presentation props and equipment. When a lull in verbal presentation is detected (i.e., the presenter is not orating but is listening to an audience participant), the present invention conversation detector may switch itself and/or certain presentation equipment to a low power consumption mode. When the presenter resumes his verbal presentation, the conversation detector detects the same and switches (returns) itself and/or presentation equipment to full power mode.

In another business application the detector is equipped with a clock and can generate a time log of conversations to facilitate automatic or assisted journaling of a user's activities in a busy day as a memory aid. There are known techniques for combining such records with additional sensor information to extract useful information such as where and with whom a conversation happened.

These and other uses of the present invention are in the purview of those skilled in the art given the following disclosure.

Applicant has discovered a method of conversation detection based on the following characteristics of captured speech:

(1) Speech waveforms are "sporadic" which means that there is an upper bound on speech signal power level after filtering and significant variation over a small time window (such as 2 seconds). Thus, in some embodiments of the present invention, detection and analysis of a constant signal input leads the detector to assume that there is too much signal (i.e. above maximum power level such as in a loud environment), or too little signal (i.e. below minimum power level such as in a quiet environment). The sensitivity can be adjusted based on these measurements and past measurements.

(2) Conversation is louder than background noise in the voice band (~1 kHz). Thus, in some embodiments of the present invention an omni-directional microphone is used as a capture device.

(3) Conversations are relatively long. Thus, the present invention conversation detector detects a burst of activity in the voice band instead of merely a start of speech. In some embodiments, input to an accumulator is a series of pulses that accumulate over time to signify a conversation. In some embodiments a series of accumulated measurements provide additional robustness.

(4) The captured power level of background noise changes slowly compared to speech.

Figure 2:
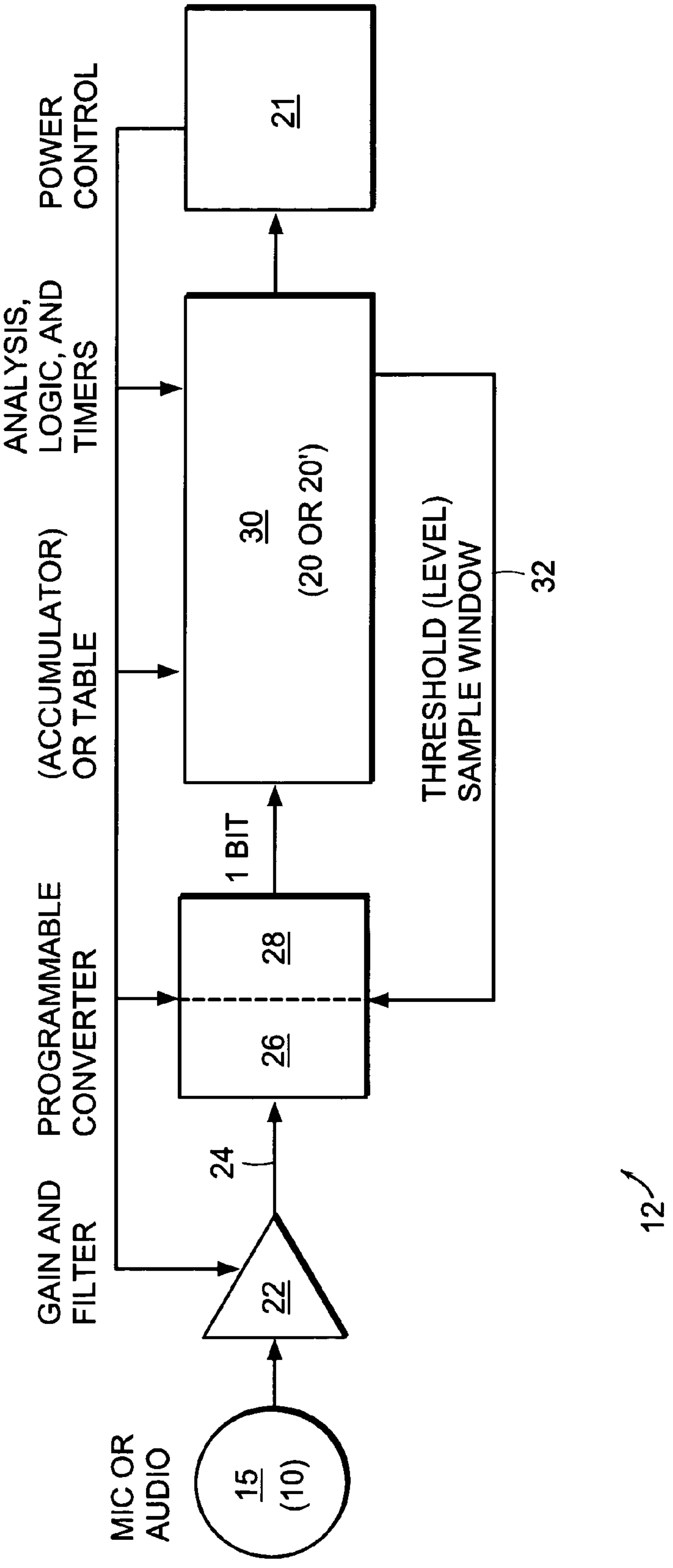
FIG. 2 is a block diagram of a conversation detector portion in the embodiment of FIG. 1

With reference to the embodiments illustrated in FIGS. 1 and 2, illustrated in FIG. 1 is an electronic system 11 employing a conversation detector 12 of the present invention. Sound waves 13 from a user or subject and the environment enter a microphone 10 of the system 11. In turn, the microphone 10 generates source audio signals 15 indicative of the sound waves 13. A conversation detector 12 is coupled to the microphone 10 to receive the source audio signals 15. The conversation detector 12 is responsive to the source audio signals 15 and makes a determination of whether or not a conversation, i.e., prolonged speech signals, exists within the received source audio signals 15.

In particular, as will be further described below, there is signal data processing by the conversation detector. In one embodiment, the data processing employs an accumulator and a set of pattern-based rules to determine if prolonged speech is occurring. In another embodiment, the data processing uses a measured time interval of activity and table of recent measurements to determine if prolonged speech is occurring. In general, the present invention data processing (conversation detector 12) utilizes adaptive rules and measured characteristics indicative of the source audio signal 15.

Output of the conversation detector 12 may produce a visual and/or audible indicator of detected conversation through an I/O subsystem 16 (e.g., display module, speaker) or the like. Conversation detector 12 output may also be provided to various applications coupled to electronic system 11, for example applications that control external devices (video cameras, projectors, digital processors or processing units) being used by or around the user/subject. To that end, the electronic system 11 includes a microprocessor or digital processing unit 17, power source, data storage (cache) and other support buses and modules as common in the art.

It is understood that the electronic system 11 may be implemented in a computer network, a telecommunications system/network and/or a stand alone device. Implemented as a portable device subject to a changing noise environment, the invention system 11 detects a conversation (a sustained period of speech) using advantageously low power (described below).

The output of the detector 12 may be used to control the power state of the portable device or to provide contextual data to a device or application running on the portable device with negligible impact to complexity, cost and power consumption on the device as further described below.

Further details of the conversation detector portion 12 of FIG. 1 follows with reference to FIG. 2.

Implementation of a Conversation Detector Using Software Accumulation of Energy

As illustrated in FIG. 2, source audio signal 15 such as from a microphone 10 or other source is amplified and filtered to match the voice band (e.g., about 1 kHZ). A band pass filter 22 or similar known filtering and/or preconditioning techniques accomplishes this and produces pre-emphasized or audio of interest signals 24. The signals 24, indicative of audio of interest, are fed into a data converter 26 which includes a digitally programmable comparator 28 acting as a 1-bit analog-to-digital converter. If the converted (digital value of) signal 24 meets a threshold energy level, then comparator 28 outputs a bit value of 1 (or high signal). Otherwise the comparator 28 outputs a zero bit value (or low signal).

The threshold energy level is typically just above ambient (~10 mv). However, depending on the period of signal activity, data processor 30 (discussed later) may change the energy level threshold. Thus standard techniques for adaptive audio thresholding may be used.

The data or signals output by comparator 28 represent a severe down-sampling of the input signal data to reduce the data rate and resolution requirements. In one embodiment, this data is accumulated by an accumulator 20. The accumulator total, which is a tally or count of bits of value 1 received, is provided to microprocessor 30. Preferably the bit data is accumulated by microprocessor 30 in clocked bursts. Controller logic in microprocessor 30 uses the accumulator total to adjust the energy level threshold for the comparator 28 as the basis of conversation detection based on signal activity, to adjust the sample window and to invalidate data from periods of excessive or insufficient input.

To differentiate between conversation (a prolonged period of speech) and noise in the voice band, a qualifier algorithm is used in one embodiment. The qualifier algorithm (at logic 30) compares a series of detected energy measurements with predetermined temporally spaced patterns of energy. Typically speech is characterized by asymmetrical patterns of energy whereas environmentally produced noise is largely symmetrical in energy patterns. The time interval between measurements may be selected to correspond with syllabic cadence in speech such that the patterns indicate energy originating from inter-word pauses and syllabic energy variation, as opposed to isolated energy pulses, broadband noise or periodic noise in the voice band. As such, logic at 30 may determine parts of speech detected. This process may be iterated for increased accuracy by requiring several unique pattern matches before signaling a valid conversation.

Figure 3:
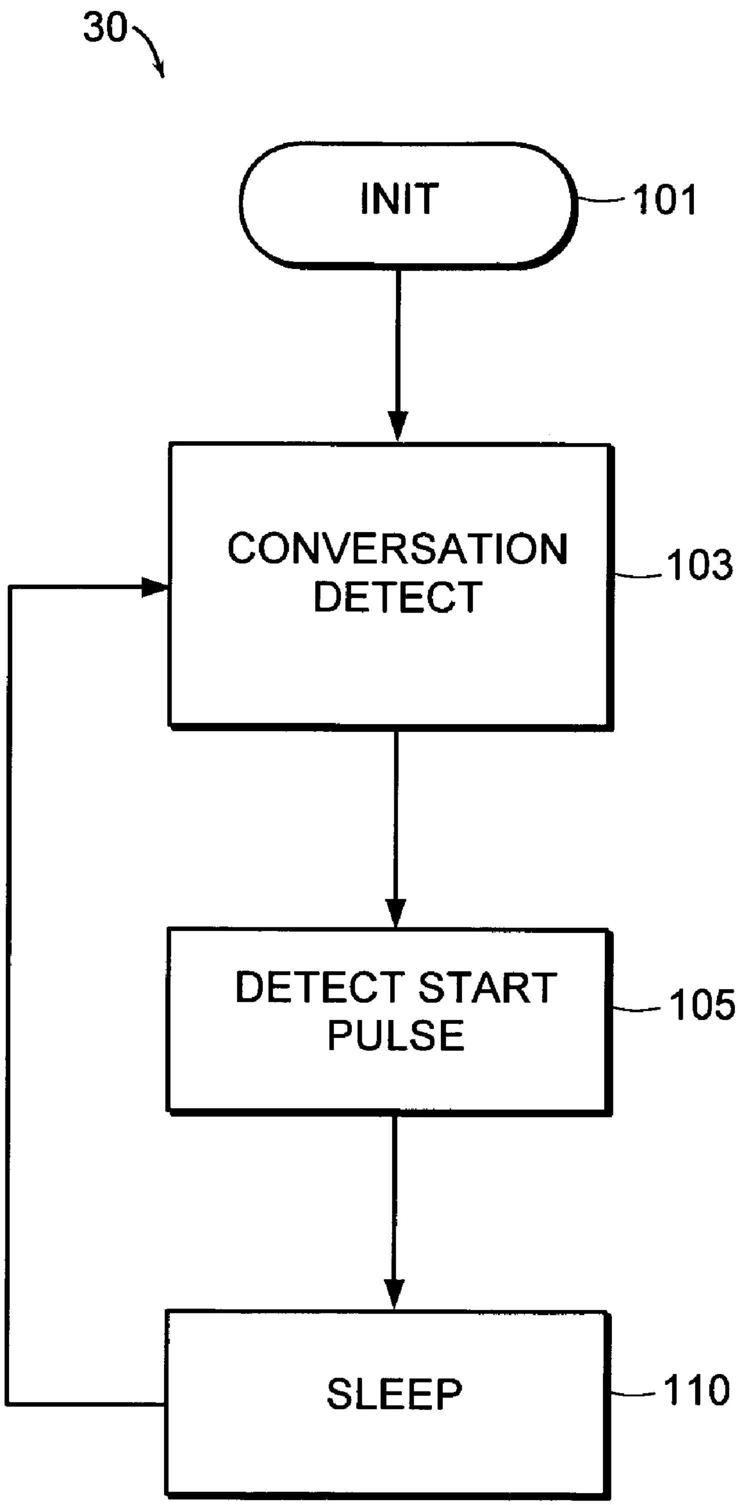
FIG. 3 is a flow diagram of processor analysis logic in the embodiment of FIG. 1.

FIG. 3 illustrates the processor logic 30 for the foregoing voice band energy detection in one embodiment. Beginning step 101 initializes analysis logic 30. A noise threshold, predetermined patterns of energy, clocks, and other thresholds (constants) are initialized. In particular, asymmetrical patterns of energy are utilized.

In step 103, detection of conversation is attempted. If no activity is detected at this time, then logic 30 effects system operation to move toward low power mode for the accumulator 20, analyzer 30 and power control 21. Analysis logic 30 idles in lower power mode until a start of pulse is detected.

In a preferred embodiment, the idle window (i.e., frequency or period of time in which to look for activity) is about 1.9 msec. A 61 ms (=32×1.9 ms) comparison window (period of time of activity) is employed. A comparison condition of n out of 32 comparisons in the comparison window is used. Once the beginning of conversation is detected a positive hold time of 1 second is used. A 16 msec rejection hold time (where no conversation is detected) is employed. Other windows of time and time periods are suitable.

Once a start of pulse (beginning of conversation) is detected, logic 30 executes step 105. In the preferred embodiment at step 105, each of 6 sample windows is obtained and scored. Preferably each sample window acquires about 5 msec of bit data. The result is about 500 samples per window. Logic 30 may pause (or run in low power sleep mode) between sample windows.

For each sample window, analysis logic 30 counts the number of samples that are bit value 1. The total number of 1-bits counted forms a working sum. The working sum is compared to the thresholds that were set in initialization step 101. In particular, if the working sum is less than the noise threshold, then logic 30 adjusts programmable comparator 28 to be more sensitive as illustrated by 32 in FIG. 2. If the working sum is greater than the noise threshold, then logic 30 turns on detector 12 at full power.

If the working sums from one sample window to the next are constantly greater than the noise threshold, then logic 30 determines that a saturation point has been reached (too much data has been sampled and tested). In this case, comparator 28 is being operated at too sensitive of a level, and logic 30 (through 32 of FIG. 2) adjusts comparator 28 to be less sensitive.

Due to the foregoing, the detector 12 is adaptable to and automatically calibrated to changing noise environments.

The 6 sample windows obtained and tested above form 6 data points for pattern matching and similar analysis. Logic 30 compares the formed data points and corresponding pattern (test pattern) to the predefined patterns of energy initialized in step 101. At least 1 word or several words may be detected and recognized. If analysis of the 6 sample windows results in all silence or all words, then logic 30 filters out symmetrical test patterns and aborts the analysis routine.

At the end of step 105, analysis 30 provides an indication of the existence of speech activity (i.e. an indication whether or not a conversation is detected and exists). The following step 110 allows logic 30 to run at low power consumption for a few seconds. In the preferred embodiment, the sleep or low power mode is allowed for a period between about 4 secs and 1 minute. The analysis process then resumes full power mode and repeats steps 103, 105 and 110.

In other embodiments, the accumulation method at 20 is an analog value using the integration of a series of pulses from the programmable comparator 28. A mathematical operation such as an RMS (root mean square) power measurement may be used to improve the signal-to-noise ratio and accuracy of the detector 12 and changes in the measured value will be used in place of the accumulator total in the above embodiment as a basis for analysis.

Implementation of a Conversation Detector Using Temporal Characteristics

In one embodiment a simplification of the detector is achieved by removing the accumulator 20 and using a temporal analysis method in which the duration of pulses from the Comparator 28 are used to detect a conversation. Logic at 30 maintains or stores, for example, 5 to 10 of the latest measured widths (in units of time) of pulses. In one embodiment, a table 20' is used to record and store entries as length of time with respect to given margins. Known techniques (e.g., table data management systems) are used to manage/purge table entries when the table is full.

The analysis logic 30 preferably applies the following temporal constraints on the data (pulses) reduced in resolution and sample rate from computer 28. An "on time" threshold defines the length of time the comparator 28 has to be active (high bit value) in order to record and analyze a reading. An "off time" threshold defines the length of time the comparator 28 is to be maintained in analysis ("care") state even when source signals 15 have stopped. "Max time" is the predefined pulse width threshold. Respective margin values are set for table entries as mentioned above.

Microprocessor logic 30 for maintaining a history table 20' is then as follows:

Initialize history table, set constants (on time, off time, max time, margins)
Test loop
  Look at comparator 28 output
  Check start of silence flag
  Check start of activity flag
  If detect first activity then
    Record start time,
    Set activity flag
    Repeat Test loop
  If detect subsequent activity
    Check time passed since activity start time against "on time"
    Check "max time" satisfied
    Repeat Test loop
  If detect start of silence
    Record time stamp of beginning of silence
    Set silence flag
    Repeat Test loop
  If detect silence
    Check time passed since time stamp of beginning of silence against "off time"
    Check history table with margins store data in table if meets criteria;
    Update table
    Repeat Test loop
End Test loop In one embodiment an interval timer at 30 and power control unit 21 are used to suspend front end (microphone 10, filter or preconditioner 22), data converter 26 and processor resources 28, 20, 30 for low power consumption. Another interval timer at 30 may be used to record data formed of software variables and a timestamp to allow analysis using additional algorithms.

A wired or wireless I/O device can be used to allow control of the detector 12 from an external device or to allow the detector 12 to cause a state change in an external device. Another device can use a record of variables and time stamps to recreate the sensor input for additional processing. A microcontroller with integrated peripherals may be used to combine the comparator 28, accumulator 20, analysis/logic/timing (collectively 30) and power control 21 blocks in a physically compact device. While this invention has been particularly shown and described with references to preferred embodiments thereof, it will be understood by those skilled in the art that various changes in form and details may be made therein without departing from the scope of the invention encompassed by the appended claims.

The method and apparatus described consume far less power than existing methods of conversation detection (VAD—voice activity detection) by taking advantage of an event-driven burst operation and event-driven power management functionality in microcontrollers. That is, preferably a microprocessor is in sleep mode (energy saving mode) until a triggering event occurs. Upon detection of a triggering event, the microprocessor changes state (i.e., to high speed operation) for performing a responsive operation to the triggering event. Upon completion of the response operation, the microprocessor returns to the low power consumption sleep mode. The triggering event may be a power on/high signal, the incoming audio signal reaching a volume threshold (sufficiently loud) and/or the incoming audio signal reaching a length of time threshold (sufficiently long).

In some embodiments, the present invention detector 12 has power requirements of less than about 70 microamps for sleep mode and about 1 mA for full power. This is about a factor of 5 to 10 less than the power requirements of conversation detectors of the prior art.

The apparatus described can differentiate between noise and conversation and can automatically calibrate to changing noise environments using a single analog channel and 1 bit A/D converter versus multiple bits and channels of resolution in existing prior art methods.

The method and apparatus described require less computational complexity than existing methods of energy detection.

The methods used may be generalized for analysis of non-speech signals. Thus as used herein "audio of interest" includes conversation, non-speech signals and other audio signals other than noise that are the subject of detection and interest based on detected patterns of signal activity.

What is claimed is:

1. A conversation detector comprising:

a signal preconditioner responsive to a source audio signal from a subject and producing a pre-emphasized signal;

a comparator coupled to receive the pre-emphasized signal and generating pulses reduced in resolution and sample rate and indicative of at least one characteristic of the pre-emphasized signal; and an analysis unit responsive to the generated pulses and utilizing adaptive rules and an indicated characteristic of the pre-emphasized signal to determine therefrom existence of a conversation by the subject;

wherein the analysis unit analyzes the generated pulses to identify whether the generated pulses form asymmetrical patterns, and wherein the analysis unit determines that the conversation exists when the generated pulses are determined to form asymmetrical patterns, wherein the patterns are asymmetrical when values of the generated pulses differ from each other wherein the analysis unit comprises a microprocessor.

2. A conversation detector as claimed in claim 1, wherein the comparator is a programmable comparator that produces single bit data.

3. A conversation detector as claimed in claim 2 further comprising an accumulator coupled to the comparator, the accumulator summing a series of received single bit values in a known time period to form an indication of detected energy level.

4. A conversation detector as claimed in claim 1 further comprising a controller coupled to at least the comparator and enabling the detector to be adapted to environmental noise changes.

5. A conversation detector as claimed in claim 4 wherein the controller enables the detector to be automatically calibrated.

6. A conversation detector as claimed in claim 4 wherein the controller includes power management of any of the preconditioner, comparator and analysis unit.

7. A conversation detector us claimed in claim 1 wherein the analysis unit further maintains a record of past generated pulses and compares duration of generated pulses to determine existence of a conversation.

8. A method for detecting conversation comprising the steps of:

detecting at least one of the characteristics of energy level and activity duration in a source audio signal from a subject;

indicating detected characteristic by pulses reduced in resolution and sample rate; and from the pulses, identifying whether the pulses form asymmetrical patterns, determining existence of a conversation by the subject when the pulses are identified as forming asymmetrical patterns, wherein the patterns are asymmetrical when values of the generated pulses differ from each other.

9. A method as claimed in claim 8 wherein the step of indicating includes producing single bit data for defining the pulses.

10. A method as claimed in claim 9 wherein the step of indicating further includes summing a series of received single bit values in a known time period to form an indication of detected energy level.

11. A method as claimed in claim 8 further comprises the step of adapting to environmental noise changes.

12. A method as claimed in claim 8 further comprising the step of automatically calibrating in noisy environments.

13. A method as claimed in claim 8 further comprising the step of providing power management to enable low power consumption operation.

14. A method as claimed in claim 8 further comprising the step of maintaining a record of past generated pulses wherein duration of active and inactive pulses are measured subject to conditions of minimum time, maximum time, hold time and idle time and stored for further analysis; and the step of determining includes comparing duration of pulses to determine existence of a conversation.

15. A conversation detection system comprising:

pulse generating means for generating pulses reduced in resolution and sample rate and indicative of at least one characteristic of a source audio signal from a subject;

the at least one characteristic being any one of (a) energy level detected in the source audio signal and (b) duration of activity detected in the source audio signal; and analysis means for determining from the generated pulses existence of a conversation by the subject;

wherein the analysis means analyzes the generated pulses to identify whether the generated pulses form asymmetrical patterns, and wherein the analysis unit determines that the conversation exists when the generated pulses are determined to form asymmetrical patterns, wherein the patterns are considered to be asymmetrical when values of the generated pulses differ from each other.

16. A conversation detection system as claimed in claim 15 wherein the pulse generating means produces single bit data.

17. A conversation detection system as claimed in claim 15 further comprising controller means for enabling at least one of (i) adaptation of the system to environmental noise changes, (ii) automatic calibration, and (iii) low power consumption operation.

* * * * *

UNITED STATES PATENT AND TRADEMARK OFFICE

CERTIFICATE OF CORRECTION

PATENT NO. : 8,315,865 B2
APPLICATION NO. : 10/838561
DATED : November 20, 2012
INVENTOR(S) : Benjamin Kuris It is certified that error appears in the above-identified patent and that said Letters Patent is hereby corrected as shown below:

In the Claims:

In column 7, line 47, in Claim 7, delete "us" and insert -- as --, therefor.

Signed and Sealed this
Fourteenth Day of May, 2013

Teresa Stanek Rea
*Acting Director of the United States Patent and Trademark Office*